Patented Aug. 1, 1950

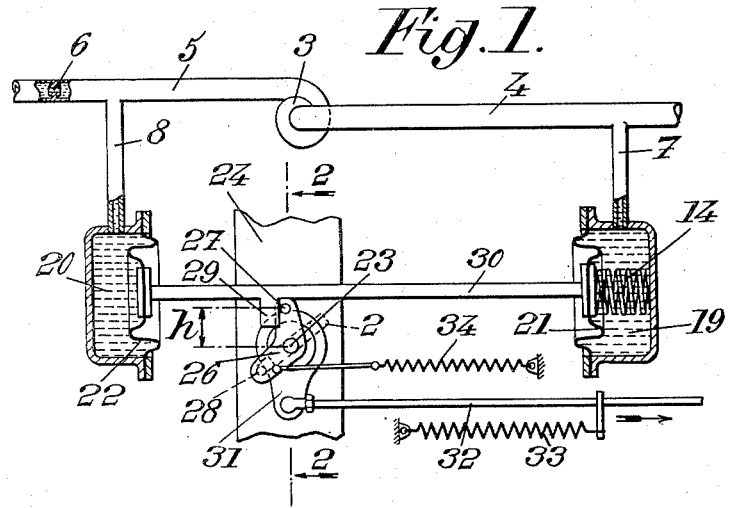
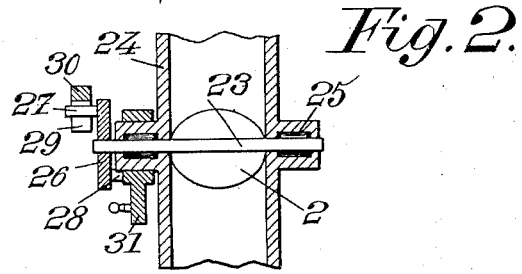
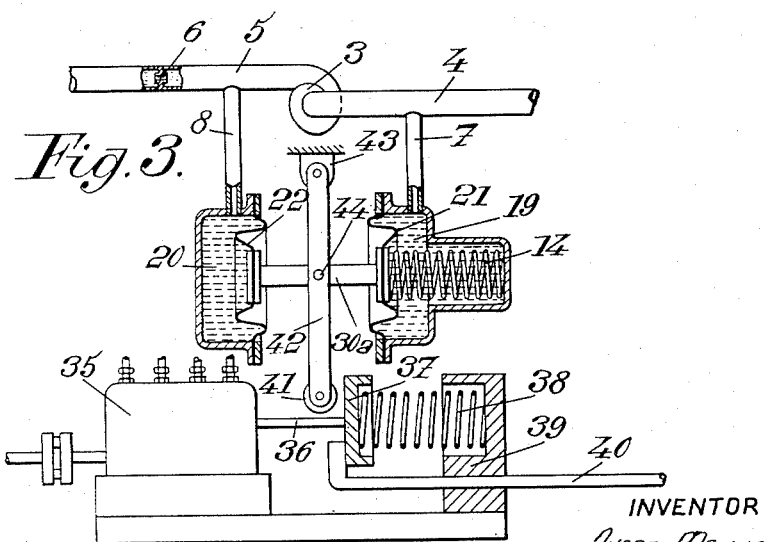

2,517,501

UNITED STATES PATENT OFFICE 2,517,501

OVERSPEED PREVENTION DEVICE FOR INTERNAL-COMBUSTION ENGINES

André Mennesson, Neuilly-sur-Seine, France, assignor to Societe Solex S. A. R. L., Neuilly-sur-Seine, France, a society of the Republic of France Application January 21, 1948, Serial No. 3,486
In France February 4, 1947

1 Claim. (Cl. 123—103)

The present invention relates to systems for preventing overspeed in internal combustion engines of the type including a control device responsive to the speed of the engine and adapted to act upon a part which adjusts the feed of fuel to this engine.

The object of my invention is to provide a device of this kind which is better adapted to meet the requirements of practice than those used up to the present time and in particular which is reliable and sensitive to engine speed variations.

According to my invention, a part connected to two diaphragms forming deformable walls of two variable volume chambers, respectively, said chambers being connected to the inlet and output sides of a fluid pump driven by the engine, cooperates, through a lost motion connection with the engine fuel feed rate control member so as to limit the amplitude of the displacements of said control member in the fuel feed rate increasing direction more and more as the difference between the pressures on the inlet and output sides of said pump is getting greater and greater, whereby said control member can be controlled directly by the vehicle driver only within a range of positions limited in the above mentioned direction by the position of said part.

Preferred embodiments of my invention will be hereinafter described with reference to the accompanying drawings, given merely by way of example and in which:

Figs. 1 and 2 show, respectively in diagrammatic elevation (with parts in section) and in vertical elevation on the line 2—2 of Fig. 1, a first embodiment of the overspeed prevention device according to my invention;

Fig. 3 shows, in elevation (with parts in section), an overspeed prevention device made according to another embodiment of my invention.

For the example disclosed by Figs. 1 and 2 it has been assumed that the internal combustion engine is fed through a carburetter of any suitable type.

In the carburetter body 24 there is provided the usual throttling member 2 (butterfly valve, for instance). A fluid pump 3 driven by the engine and, for instance, of the centrifugal, blade, gear, membrane, etc., type, serves to circulate any liquid or gaseous fluid (water, oil, gas, etc.) used for the engine or for the vehicle on which this engine is fitted. The pump intake conduit is designated by 4 and its delivery conduit by 5. In this last mentioned conduit is indicated a calibrated orifice 6 which, as a matter of fact does not exist but corresponds to the sum of the pressure drops that occur in the fluid circuit at the output of the pump.

From conduits 4 and 5 (on the upstream side of orifice 6) are respectively branched two conduits 7 and 8 through which the static and/or dynamic pressures existing respectively on the inlet and output sides of the pump are transmitted through the medium of the fluid flowing through said pump.

Conduits 7 and 8 open respectively into two manometric chambers or boxes 19 and 20 each closed by a flexible diaphragm 21 or 22.

These diaphragms 21 and 22 are connected together by a rod 30.

The spindle 23 of throttle valve 2, pivoted in the body 24 of the carburetter, preferably through the intermediate of ball bearings 25, carries, at one end thereof, a lever 26 the opposed ends of which carry two lugs 27 and 28 respectively. Lug 27 cooperates with a projection 29 of rod 30. Lug 28 transmits to lever 26 and consequently to valve 2 the movement of an arm 31 freely pivoted on the bearing concentric to axis 23, this arm being connected through a rod 32 with the throttle control operated by the driver. A spring 33 tends to return the throttle toward its closed or idling position when the driver ceases to act on the control. A spring 34, of lower strength, is provided between lever 26 and a fixed point and urges lever 26 in a direction for which it tends to open valve 2. If need be, there may be provided in box 19 a spring 14, of relatively low power, which tends to return diaphragms 21 and 22, rod 30 and control projection 29 toward the right of Fig. 1 when the engine is stopped.

The device thus constituted works in the following manner. When the engine is stopped or idling and when the driver is not acting on the throttle pedal, spring 14 keeps rod 30 and projection 29 in their extreme position toward the left of Fig. 1. Furthermore, the more powerful spring 33 causes valve 2 to be closed and moves arm 31 toward the left of Fig. 1 and, consequently, lever 26, through the intermediate of lug 28, against the action of the weaker spring 34. When the engine is idling and the driver depresses the throttle pedal, he drives rod 32 in the direction of the arrow (toward the right of Fig. 1), against the action of spring 33.

When the engine is running at low speed, spring 34 keeps lug 28 in contact with arm 31 and valve 2 can open normally under the action of the throttle pedal. When the engine speed reaches a predetermined value, the difference between the pressures on the downstream and upstream sides of pump 3 becomes sufficient to move diaphragms 21 and 22, rod 30 and projection 29 toward the right of Fig. 1 and projection 29 acts, through lug 27, on lever 26 in the direction corresponding to the closing of valve 2 and against the action of spring 34. Lug 28 then ceases to be in contact with arm 31 and the engine speed tends to be stabilized at a given value, determined by the strengths of springs 34 and 14. If, in the course of operation, and for any reason whatever, the driver wishes to move valve 2 closer to its closed position, it suffices for him to allow the throttle pedal to move upwardly, whereby rod 32 is driven by its spring 33 toward the left of Fig. 1 or in a direction opposed to that of the arrow. Arm 31 thus comes into contact with the lug 28 of lever 26, which causes valve 2 to close either partly or fully, lug 27 ceasing to be in contact with projection 29.

The speed of the engine is therefore well determined as a function of the characteristics of pump 3 and the strengths of springs 34 and 14. Furthermore, the shape of lever 26 permits of obtaining a variation of the lever arm with which projection 29 acts upon lever 26, this lever arm being the vertical distance $h$ between lug 27 and the spindle 23 of valve 2. The leverage with which spring 34 acts upon lever 26 can also be used through well known suitable means, in particular those described in French Patent No. 771,169 filed in the name of Society Solex.

In the example shown by Fig. 3, the engine is fed through an injection pump 35 as, for instance, in the case of Diesel engines, and the feed rate thereof is adjustable through the adjustment device, diagrammatically shown by a rod 36 provided with a plate 37. Displacement of rod 36 toward the right of Fig. 3 has for its effect to reduce the output of pump 3 and therefore the speed of the engine. A spring 38, provided between plate 37 and a fixed point 39, tends constantly to increase the output of this pump.

The driver acts through distance control means including a rod 40 for moving rod 36 and plate 37 toward the right of Fig. 3 against the action of spring 38.

In order to increase the speed of the engine, control rod 40 is moved toward the left of Fig. 3, which releases plate 37 which is then pushed in the same direction by the action of spring 38 until it comes into contact with an abutment constituted, for instance, by roller 41 mounted on the free end of a lever 42 pivoted about a fixed point 43 and connected through a pivot 44 with a rod 30a provided between the two diaphragms 21 and 22 of a system analogous to that described with reference to Fig. 1.

If the engine is running at low speed, roller 41 is located as far as possible toward the left of Fig. 3 and rod 36 follows all the displacements of control rod 40. On the contrary, if the speed of the engine increases, the whole of diaphragms 21 and 22 moves toward the right of Fig. 3, together with pivot 44 and therefore roller 41, until said roller comes into contact with plate 37 and pushes it back toward the right of Fig. 3, against the action of spring 38, so as thus to limit the speed of the engine.

At this time, control rod 40 no longer has any action to increase the pump output and the driver can only reduce this output by a displacement of this rod 40 toward the left. A regulation action is thus obtained which depends merely upon the characteristics of spring 38 and spring 14, and permits of adopting for this action a predetermined value of the maximum speed of the engine.

Of course, the pressure connections on the downstream and upstream sides of circulation pump 3 may, in all cases, be made such as to obtain dynamic and/or static pressure action of the flowing fluid.

Thus, through a suitable choice of one or several elements (calibrated or adjustable strength springs) distinct from the pressure conditions of the circulation pump, it is possible to obtain a predetermined and adjustable maximum speed value for the engine.

Adjustment of the strength of springs 14, 34 and 38 may be left at the disposal of the driver through suitable control means, either from a distance or not, so that he can adjust the maximum speed to the desired valve.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

An overspeed prevention device for an internal combustion engine which comprises, in combination, means for determining the rate of feed of fuel to said engine including a movable feed rate control member, a fluid pump driven by said engine, two boxes respectively connected with the input and output sides of said pump, respectively, each of said boxes having one wall constituted by a flexible diaphragm, a part fixed to both of said diaphragms so as to be movable in response to variations in the difference between the fluid pressures on the inlet and ouput sides of said pump, respectively, a lost motion connection between said part and said control member for limiting the amplitude of the displacements of said control member in the fuel feed rate increasing direction more and more as the difference between the pressures on the inlet and outlet sides of said pump is getting greater and greater and means directly operative by the vehicle driver for moving at will said control member within a range of positions limited in the above mentioned direction by the position of said part.

ANDRÉ MENNESSON.

REFERENCES CITED

The following references are of record in the file of this patent:

UNITED STATES PATENTS

| Number | Name | Date |
|---|---|---|
| 1,571,977 | Trotter et al. | Feb. 9, 1926 |
| 2,359,231 | Mallory | Sept. 26, 1944 |
| 2,369,397 | Kostenick | Feb. 13, 1945 |
| 2,450,199 | Leibing | Sept. 28, 1948 |